(12) United States Patent
Kang et al.

(10) Patent No.: US 11,211,177 B2
(45) Date of Patent: Dec. 28, 2021

(54) SCREEN SHARING SYSTEM OF DIGITAL MAIN CONTROL ROOM IN NUCLEAR POWER PLANT

(71) Applicant: KOREA HYDRO & NUCLEAR POWER CO., LTD., Gyeongsangbuk-do (KR)

(72) Inventors: Sung Kon Kang, Daejeon (KR); Chan Ho Sung, Daejeon (KR); Yeon Sub Jung, Daejeon (KR)

(73) Assignee: KOREA HYDRO & NUCLEAR POWER CO., LTD., Gyeongsangbuk-Do (KR)

( * ) Notice: Subject to any disclaimer, the term of this patent is extended or adjusted under 35 U.S.C. 154(b) by 504 days.

(21) Appl. No.: 16/319,520

(22) PCT Filed: May 25, 2017

(86) PCT No.: PCT/KR2017/005478
§ 371 (c)(1),
(2) Date: Jan. 22, 2019

(87) PCT Pub. No.: WO2018/021670
PCT Pub. Date: Feb. 1, 2018

(65) Prior Publication Data
US 2020/0176141 A1    Jun. 4, 2020

(30) Foreign Application Priority Data

Jul. 27, 2016    (KR) .................... 10-2016-0095514

(51) Int. Cl.
*G21D 3/00*       (2006.01)
*G05B 15/02*    (2006.01)
(Continued)

(52) U.S. Cl.
CPC ............. *G21D 3/008* (2013.01); *G05B 15/02* (2013.01); *G06F 3/1454* (2013.01); *G21C 17/00* (2013.01); *G21D 3/001* (2013.01); *G21D 3/04* (2013.01)

(58) Field of Classification Search
CPC .......... G21D 3/04; G21D 3/008; G21D 3/001; G21D 3/06; G21D 3/08; G21D 3/00;
(Continued)

(56) References Cited

U.S. PATENT DOCUMENTS

| 5,394,447 A * | 2/1995 | Scarola | G21C 17/00 376/259 |
| 2008/0115073 A1* | 5/2008 | Erickson | G09G 5/14 715/766 |

(Continued)

FOREIGN PATENT DOCUMENTS

| KR | 1020160011158 A | 1/2016 |
| KR | 1020160066070 A | 6/2016 |
| WO | 2013032764 A1 | 3/2013 |

OTHER PUBLICATIONS

Kang, S. et al., Development of Display Sharing System for Operation Support for APR1400 Digital Main Control Room, Jun. 23, 2016, pp. 1147-1149.

*Primary Examiner* — Darlene M Ritchie
(74) *Attorney, Agent, or Firm* — Standley Law Group LLP

(57) ABSTRACT

The present invention relates to a screen sharing system of a nuclear power plant main control room for improving operation safety of a power plant. According to an example of the present invention, a power plant control screen of each operator is shared in real-time among other operators by a simple manipulation such that operators can easily simultaneously check a power plant operation screen of other operators, whereby a mistake of another operator can be (Continued)

detected and manipulated in time, thus improving operation safety of a power plant.

7 Claims, 6 Drawing Sheets

(51) Int. Cl.
*G21C 17/00* (2006.01)
*G21D 3/04* (2006.01)
*G06F 3/14* (2006.01)

(58) Field of Classification Search
CPC .......... G06F 13/00; G06F 3/1454; G06F 3/14; G21C 17/00; Y02E 30/00; Y02E 30/30; H04N 21/436; G05B 15/02
See application file for complete search history.

(56) References Cited

U.S. PATENT DOCUMENTS

| | | | |
|---|---|---|---|
| 2011/0145451 A1* | 6/2011 | Softer | G06F 21/82 |
| | | | 710/64 |
| 2013/0129030 A1 | 5/2013 | Hanada et al. | |
| 2014/0133618 A1 | 5/2014 | Graham | |
| 2015/0049851 A1* | 2/2015 | Yokoyama | G21D 3/001 |
| | | | 376/217 |
| 2018/0095710 A1* | 4/2018 | Petrov | G06F 9/45533 |
| 2018/0267770 A1* | 9/2018 | Kumar | G06F 9/45558 |

\* cited by examiner

SCREEN SHARING SYSTEM OF DIGITAL MAIN CONTROL ROOM IN NUCLEAR POWER PLANT

TECHNICAL FIELD

The present invention relates to a screen sharing system of a nuclear power plant main control room for improving operation safety of a power plant. More particularly, the present invention relates to a screen sharing system of a nuclear power plant main control room in which a power plant control screen of each operator is shared in real-time among other operators by a simple manipulation such that operators can easily simultaneously check a power plant operation screen of other operators, whereby a mistake of another operator can be detected and manipulated in time, thus improving operation safety of a power plant.

BACKGROUND ART

When verifying a power plant process parameter and performing a device component in a nuclear power plant main control room, if an operator makes a mistake, the same has to be prevented by enabling simultaneous monitoring operation screens of other operators.

A seated-type digital main control room has been introduced instead of a conventional stand-up analog based main control room, and thus physical work load due to the movement of the operator has been reduced. However, it is not easy to check the operation behavior of other operators.

In other words, in a conventional digital main control room, when an operator uses an input device such as a mouse, etc. for Soft Control, the use of the operator is represented in an MMI (man-machine interface) operation screen of another operator as an active control box (white line around object in display design of APR1400 nuclear Power Plant). When an A operator selects the same MMI screen with a B operator, a screen manipulated by the B operator may be checked.

Accordingly, A and B operators are not able to share in real-time their power plant control manipulation screen of a nuclear power plant among themselves, and thus it may cause a big problem in ensuring operation safety. In other words, before an A operator who has to monitor a manipulation of a B operator loads a screen of the operator to be monitored on his or her MMI operation screen by searching for the same, monitoring a manipulation of the B operator is not performed, and when the B operator makes a mistake at that time, a proper action may not be immediately provided.

DOCUMENTS OF RELATED ART

Patent Document (Patent document 1) Korean Patent Application Publication No 10-2016-0011158

DISCLOSURE

Technical Problem

Accordingly, an object of the present invention is to provide a screen sharing system and apparatus, the system and apparatus being capable of sharing in real-time a power plant control manipulation screen among operators when operating a nuclear power plant, and simultaneously checking the same.

Technical Solution

In order to accomplish the above object, according to an embodiment of the present invention, a screen sharing system for a digital main control room of a nuclear power plant, wherein the system includes an information processing system for digital control, the system includes: an image signal output unit outputting and transmitting an image signal generated by using the information processing system; a sharing screen displaying unit receiving the image signal and displaying the same; an image signal relay unit connected to the image signal output unit and the sharing screen displaying unit, and receiving and outputting the image signal; a sharing control signal generating unit generating a sharing control signal selecting an image signal and the sharing screen displaying unit which are selected by a user; and an image signal relay control unit receiving the sharing control signal generated by the sharing control signal generating unit, and controlling input/output of the image signal relay unit such that the image signal selected according to the received sharing control signal is displayed on the selected sharing screen displaying unit.

In addition, according to another embodiment of the present invention, screen sharing system for a digital main control room of a nuclear power plant, wherein the system includes an information processing system for digital control, the system includes: an image signal output unit outputting and transmitting an image signal generated by using the information processing system; a sharing screen displaying unit receiving the image signal and displaying the same; an image signal relay unit connected to the image signal output unit and the sharing screen displaying unit, and receiving and outputting the image signal; a detection signal generating unit generating a detection signal by detecting a manipulation of a control command input means of a power plant which is provided in the information processing system; a sharing control signal generating unit selecting in real-time an image signal in response to the detection signal, and generating a sharing control signal selecting the sharing screen displaying unit selected by a user; and an image signal relay control unit receiving the sharing control signal generated by the sharing control signal generating unit and the detection signal generated by the detection signal generating unit, and controlling input/output of the image signal relay unit such that the image signal selected in real-time according to the received detection signal is displayed on the sharing screen displaying unit selected according to the sharing control signal.

Preferably, the sharing control signal generating unit may: select an image signal selected by a user or selects an image signal in real-time in response to the detection signal; and generate the sharing control signal selecting the sharing screen displaying unit selected by the user, and the image signal relay control unit may: receive the sharing control signal generated by the sharing control signal generating unit, and control input/output of the image signal relay unit such that the image signal selected according to the received sharing control signal is displayed on the selected sharing screen displaying unit; or receives the sharing control signal generated by the sharing control signal generating unit and the detection signal generated by the detection signal generating unit, and controls input/output of the image signal relay unit such that the image signal selected in real-time according to the received detection signal is displayed on the sharing screen displaying unit selected according to the received sharing control signal.

Preferably, the image signal output unit may be configured with any one of a graphic card directly outputting an image signal of the information processing system, a video distributor outputting an image signal of the information processing system by copying the same, and a video scaler outputting a single image signal by overlapping a plurality of image signals of the information processing system, the image signal relay unit may be a video matrix connected to the image signal output unit and the sharing screen displaying unit through an image signal cable, and the image signal relay control unit may be a video matrix controller connected to the video matrix through a serial cable, wherein the image signal may be transmitted through an image signal cable network rather than a network.

Advantageous Effects

According to the above, easy monitoring in real-time among operators can be available when performing important operational manipulations under various operational environments of a nuclear power plant, and thus reliability and safety of operation in a nuclear power plant can be improved by preventing a mistake made by an operator while performing operation alone. In addition, when screen sharing, when a hardware device directly that transmits an image signal of a screen rather than transmitting through a network, an additional cyber-security problem caused by using a network signal does not occur, a situation can be prevented where transmission of a control command and supporting of another operator are not smoothly performed due to a load on a network according to transmission in real-time of a screen image.

BEST MODE

Figure 1:
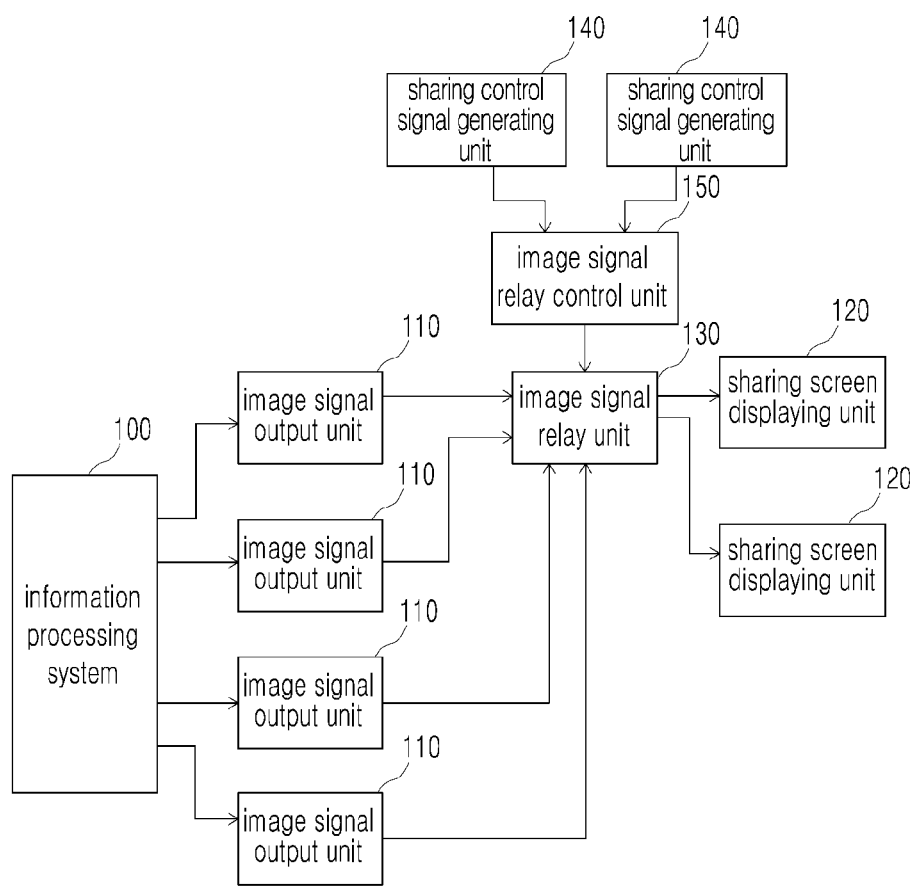
FIG. 1 is a view of a block diagram of a screen sharing system according to the present invention.

Advantages and features of the present invention, and method to achieve them of the present invention will be obvious with reference to embodiments along with the accompanying drawings which are described below. Meanwhile, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Terminologies used in this specification are selected from general terminologies that are widely used at present if possible while considering functions in the present invention. However, such terminologies may be changed according to intention of those skilled in the art to which the present invention pertains, conventional practices, or appearance of new technology. In a specific case, the applicant selects the terminologies voluntarily as required. In this case, meanings of the voluntary terminologies will be described in the following description of the present invention in detail. Thus, it should be noted that terminologies used in this specification be interpreted based on the detailed description of the present invention and the intended meanings of the terms rather than their simple names.

In the present specification, a description of a certain part "including" certain constituents means capable of further including other constituents, and does not exclude other constituents unless particularly stated on the contrary.

Hereinafter, the present invention will be described in detail with reference to the accompanying drawings in such a manner that the invention may be easily carried out by one of ordinary skill in the art to which the present invention pertains. However, the present invention may be realized in various forms, and it is not limited to the embodiments described herein. In the drawings, publicly known functions and configurations that are judged to be able to make the purport of the present invention unnecessarily obscure will not be illustrated.

FIG. 1 is a view of a block diagram of a screen sharing system for a nuclear power plant digital main control room for digital control according to an embodiment of the present invention. Referring to FIG. 1, a screen sharing system for a nuclear power plant digital main control room for digital control according to an embodiment of the present invention may include an information processing system 100, an image signal output unit 110, a sharing screen displaying unit 120, an image signal relay unit 130, a sharing control signal generating unit 140, and an image signal relay control unit 150.

Figure 2:
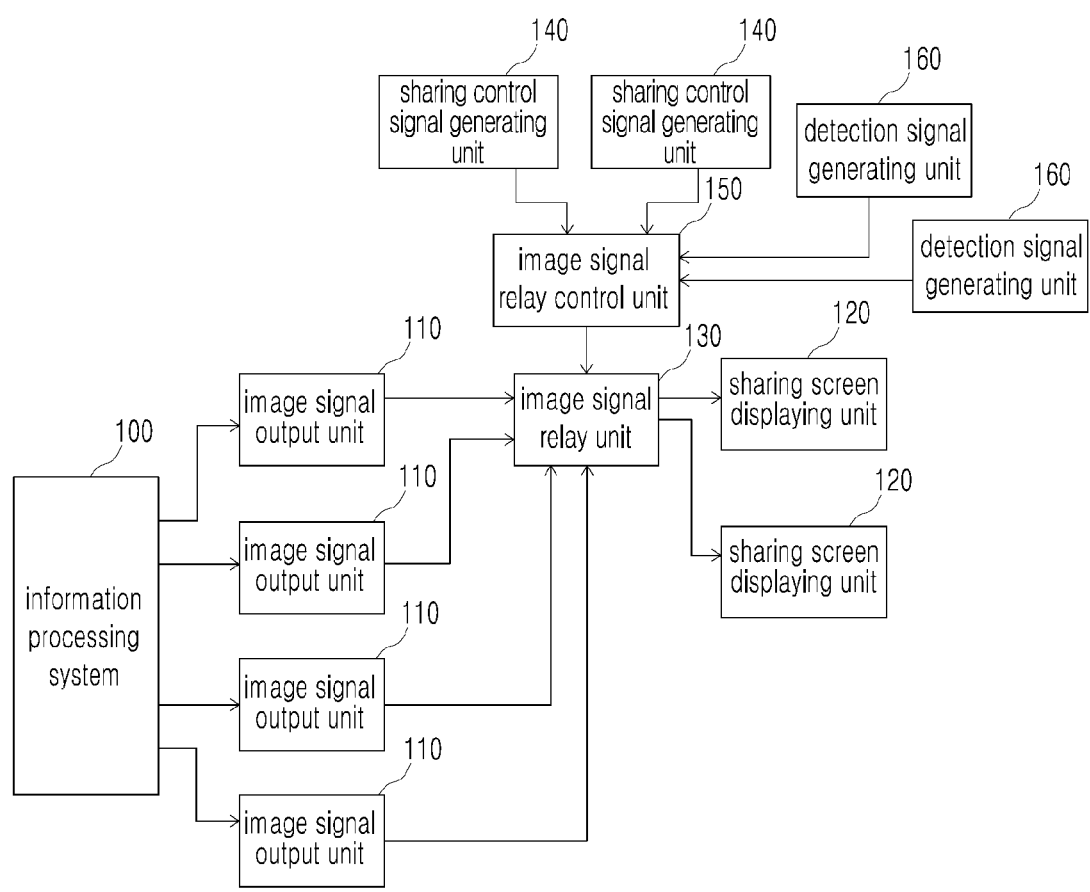
FIG. 2 is a view of a block diagram of a screen sharing system according to the present invention which includes a detection signal generating unit 160.

FIG. 2 is a block diagram of a screen sharing system of a nuclear power plant main control room which includes an information processing system for digital control according to another embodiment of the present invention. Referring to FIG. 2, a screen sharing system of a nuclear power plant main control room which includes an information processing system for digital control according to another embodiment of the present invention may include an information processing system 100, an image signal output unit 110, a sharing screen displaying unit 120, an image signal relay unit 130, a detection signal generating unit 160, a sharing control signal generating unit 140, and an image signal relay control unit 150.

Figure 3:
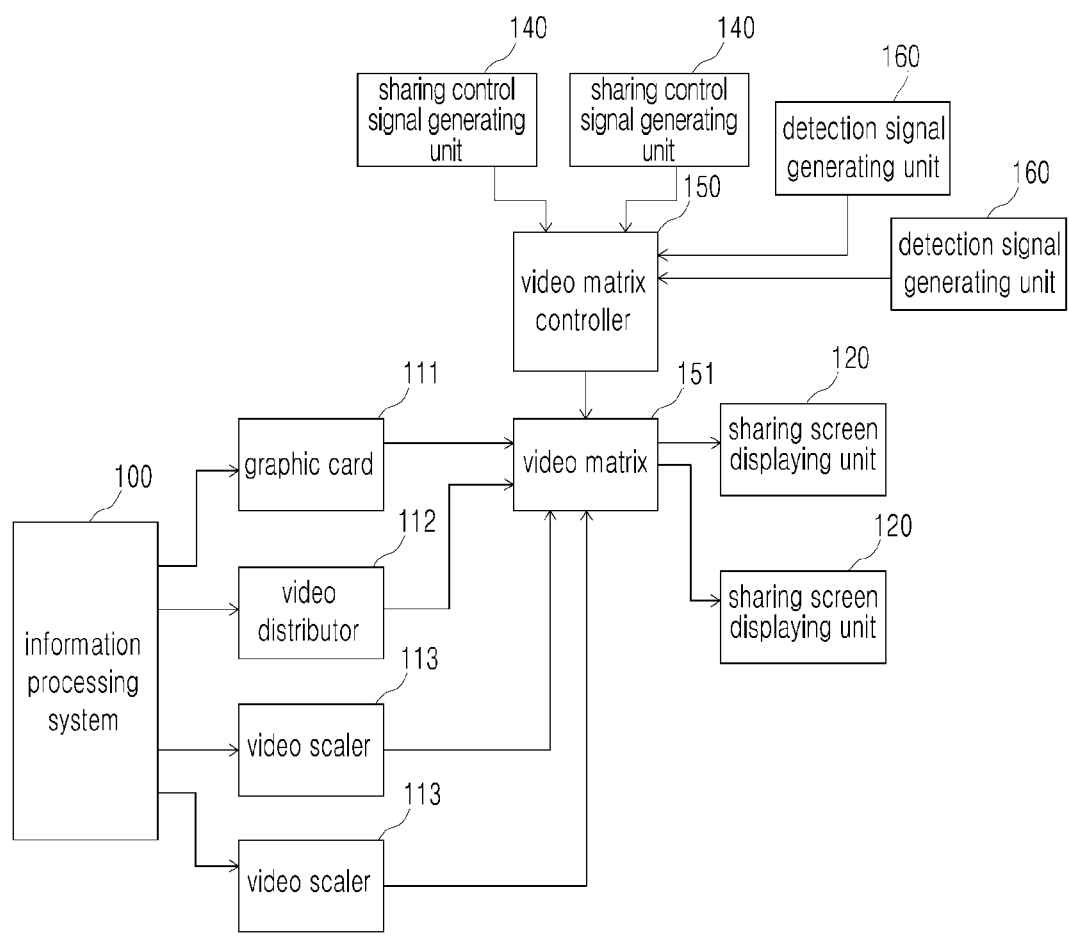
FIG. 3 is a view of a block diagram of a screen sharing system according to the present invention which includes a graphic card 111, a video distributor 112, and a video scaler 113 as an image signal output unit 110.

For convenience of description, in FIGS. 1 to 3, each element is represented by a limited number, but the number of each element is not limited to the number shown in the figures.

The information processing system 100 generates and provides an image signal of a screen which is capable of determining a process parameter and performing a component control by processing various pieces of information for operation of a power plant. In addition, the information processing system 100 may include display devices required for determining a process parameter and performing a component control for operation of a power plant. The information processing system 100 of the nuclear power plant digital main control room may include an operator workstation (OWS) constituting a part of an operator console for each position in a seated-type, or may include a general PC. In an embodiment of the present invention, at least one or a plurality of information processing system 100 may be present.

The image signal output unit 110 outputs an image signal generated by the information processing system 100 to the image signal relay unit 130. The image signal output unit may output one image signal, and the present invention may include a plurality of image signal output units. The image signal output unit 110 may output to a network an image signal by using a software based method, or may output directly to a cable network by copying an image signal as it is by using a hardware based method.

A software based method is a method of collecting, by the image signal output unit 110, an image signal in a buffer, and transmitting the image signal collected in the buffer as a network signal through a network. The above method may be practiced by the information processing system 100 including software that uses as a buffer a storage device included in the information processing system 100.

However, in outputting an image signal of all screens which are required for sharing in real time, when a software based method is used as a method of providing a power plant control manipulation screen among operators in real time and the image signal is transmitted as a network signal through a network, transmission of a control command and operation of other operator supporting functions may not work well due to overload on a network of a power plant. In addition, when a network signal is used, a cyber security problem occurs inevitably.

Accordingly, it is preferable to use a hardware based method that directly transmits an image signal of an operator monitor screen used by each operator.

FIG. 3 is a block diagram of a screen sharing system for a nuclear power plant digital main control room according to an embodiment for implementing the present invention on the basis of hardware.

In order to directly output an image signal on the basis of hardware, each image signal output unit 110 may be configured as below.

First, the image signal output unit 110 may be configured such that an image signal is directly output from a graphic card 111 to the image signal relay unit 130. In an embodiment of the present invention, two graphic cards are installed in an OWS, and thus, in addition to a graphic card outputting an image signal to a flat panel display (FPD) of a corresponding seat operator, the image signal is output to the image signal relay unit 130 from an additional graphic card. Rather than using a plurality of graphic cards as the embodiment described above, a single graphic card may include a number of graphic card output units so as to obtain the same effect.

Second, the image signal output unit 110 may be configured such that an image signal is copied in a video distributor 112. The video distributor 112 may receive an image signal, and output a plurality of image signals. In an embodiment, the video distributor 112 may receive one image signal and output two image signals by copying the same. Accordingly, even though the information processing system 100 includes one graphic card outputting one image signal, an image signal may be directly transmitted and shared on the basis of hardware without using a network. In an embodiment of the present invention, the video distributor 112 receives one image signal from an ESCM PC, transmits one of the two copied image signals to an ESCM FPD, and transmits the other one to the image signal relay unit 130.

Third, the image signal output unit 110 may be configured such that a video scaler 113 outputs an overlapped image signal. The video scaler receives a plurality of image signals, and output one image signal by overlapping the same. In an embodiment of the present invention, the video scaler 113 receives an image signal generated from each of the OWS and the ESCM PC, and outputs one image signal by overlapping the two input image signals. Accordingly, when a plurality of screens is shared by using one screen, the video scaler 113 may be used, or the video scaler 113 may be used for decreasing a number of display devices required for screen sharing, and for decreasing an area therefor. The video scaler 113 may be configured to directly receive a plurality of image signals from a graphic card, receive via the video distributor, or directly receive a partial image signal from the graphic card and receive the remaining via the video distributor. All image signal output units 110 with the above configuration may be included in a configuration configured such that a video scaler 113 outputs one image signal by overlapping image signals. In an embodiment, the video scaler 113 may overlap screens by using an overlay method.

Figure 4:
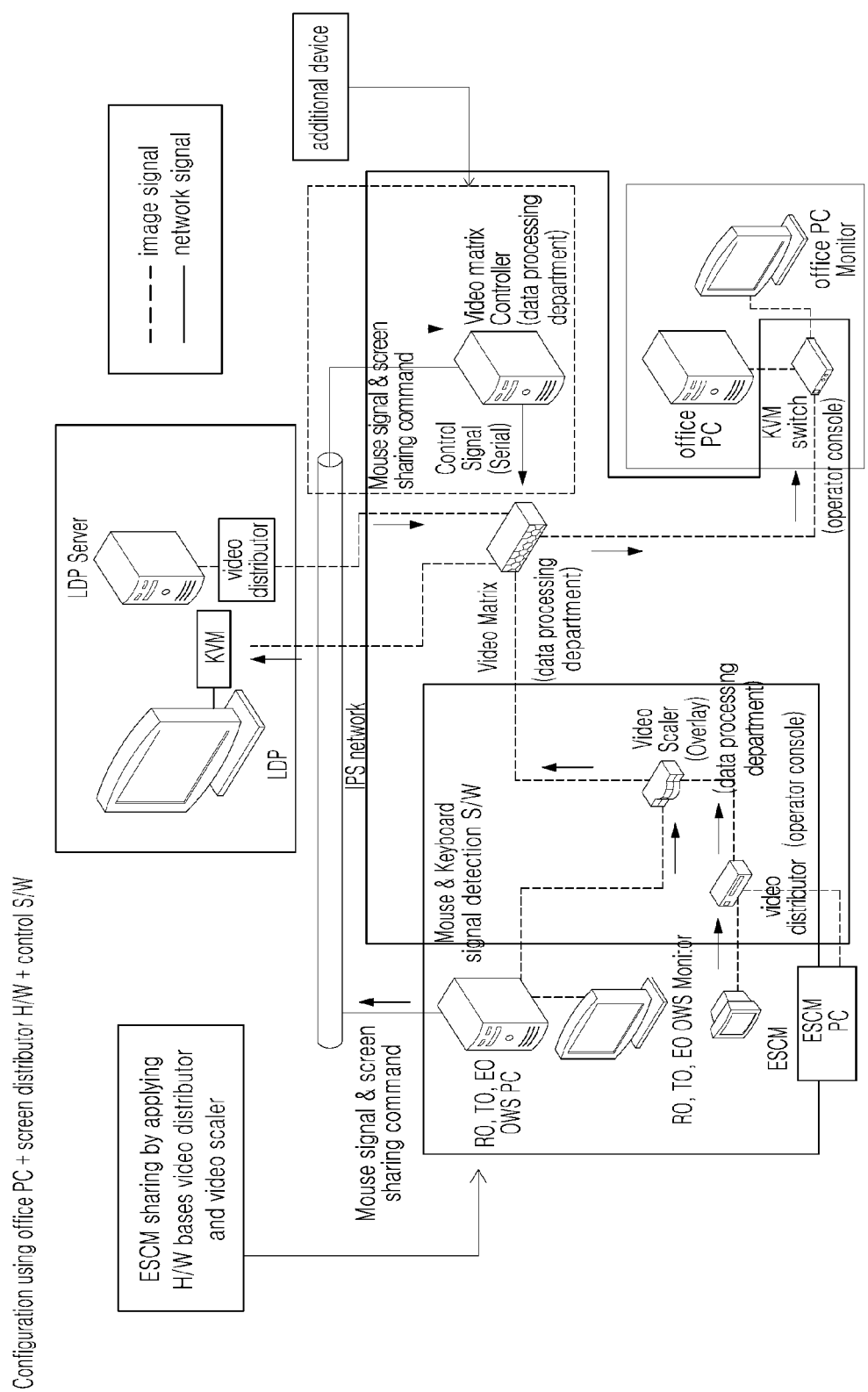
FIG. 4 is a view of a configuration diagram according to an embodiment of the present invention.

Each image signal output unit 110 constituting the present invention may include any configuration that outputs an image signal to a final screen. A detailed configuration of each of the plurality of image signal output units 110 may differ from each other without being matched to the same one. Referring to FIG. 3, the plurality of image signal output unit 110s are configured with the graphic card 111, the video distributor 112, and the video scaler 113. The video scaler 113 receives a plurality of image signals generated in the information processing system 100, and outputs one image signal. Referring to FIG. 4, in an embodiment of the present invention, an image output unit may be configured by a plurality of video scalers 113 that overlap two image signals displayed on Information FPD and ESCM FPD screens by using an overlay method.

The sharing screen displaying unit 120 may receive and display an image signal. The sharing screen displaying unit 120 refers to a display device that receives an image signal and displays the same on a screen. A plurality of sharing screen displaying units may be included, or a single large size display device may display a sharing screen by dividing the same into sections.

Preferably, a plurality of large size LDP monitors may be included so as to make screen sharing among all operators easy, or an office PC monitor included in each operator console may be included so as to make screen sharing for each operator easy.

In addition, the sharing screen displaying unit 120 may further include a KVM switch such that a desired screen among a plurality of image signals is selected and displayed. In an embodiment of the present invention, when a KVM switch is used for an office PC monitor, a desired screen between an image signal input from an office PC and an image signal of a sharing screen which is input from the image signal relay unit 130 may be selected and displayed alternately on the single office PC monitor. Of course, a large size LDP monitor may include a KVM switch so as to display an image signal by switching a plurality of image signals.

The image signal relay unit 130 may be connected to the image signal output unit 110 such that the image signal relay unit 130 receives an image signal output from the image signal output unit 110 and outputs the same to the sharing screen displaying unit, and the image signal relay unit 130 is connected to the sharing screen displaying unit 120.

In an embodiment, the image signal relay unit 130 is connected to the image signal relay control unit 150, and outputs to the sharing screen displaying unit 120 an image signal provided for screen sharing among a plurality of image signals input according to a control of the image signal relay control unit 150.

The image signal relay unit 130, each image signal output unit 110, and the sharing screen displaying unit 120 may be connected through a network. In such an embodiment, the image signal relay unit 130 may be configured by using the information processing system 100 in a software based method, and may use as a buffer a storage device included in the information processing system 100. Alternatively, in addition to the information processing system 100, an additional information processing system may be used.

However, transmitting an image signal of a screen that is not currently shared through a network may cause overload on the network. Accordingly, it is preferable to include a video matrix 151 that is additional hardware such that the image signal relay unit 130 directly transmits an image signal from each image signal output unit 110 by being connected to the sharing screen displaying unit 120. FIGS. 3 and 4 are views of a block diagram of a screen sharing system for a nuclear power plant digital main control room in which each image signal relay unit includes a video matrix 151.

The screen sharing system of the present invention may include a detection signal generating unit 160. The detection signal generating unit 160 may generate a detection signal by detecting manipulation of a digital control command input device such as a mouse, etc. which is provided in the information processing system 100.

In an embodiment, the detection signal generating unit 160 may be configured by an information processing system 100 including a program detecting manipulation of a mouse, a keyboard, etc. The detection signal generating unit 160 may detect mouse movement, input of a keyboard key and generate a detection signal enabling the image signal relay control unit 150 to select an image signal so that a screen is shared where manipulation of the mouse or keyboard occurs.

In an embodiment, a detection signal generated by the detection signal generating unit 160 may be transmitted to the image signal relay control unit 150 through a network. In another embodiment, a detection signal generated by the detection signal generating unit 160 may be transmitted to the image signal relay control unit 150 through a network.

In an embodiment, a detection signal may be permanently transmitted to the image signal relay control unit 150, or may be selectively transmitted when screen sharing among operators in real-time is required.

The sharing control signal generating unit 140 may select an image signal to be displayed on the screen displaying unit 120 among image signals output from the image signal output unit 110 according to a user selection, and generate a control signal selecting the sharing screen displaying unit 120 on which the selected image signal is displayed.

In another embodiment, the sharing control signal generating unit 140 may select in real-time an image signal to be displayed on the sharing screen displaying unit 120 among image signals output from the image signal output unit 110 according to a detection signal, and generate a control signal selecting the sharing screen displaying unit 120 on which the selected image signal is displayed according to a user selection.

Of course, the sharing control signal generating unit 140 may be configured such that a real-time switching function between continuous sharing of a screen selected by a user selection and a sharing screen according to a detection signal is available according to a user selection.

In an embodiment, the sharing control signal generating unit 140 may use additional hardware or information processing system, but preferably, may be an information processing system 100 including software that processes a control signal by receiving a user command.

In an embodiment, at least one sharing control signal generating unit 140 is present, or preferably, a plurality of sharing control signal generating units 140 may be present. In addition, the sharing control signal generating unit 140 may be configured by using an information processing system 100 provided in an operator console of each operator.

In an embodiment, the sharing control signal generating unit 140 may include the information processing system 100 including a program that: provides a screen sharing control menu screen 200 within an Information FPD operation screen of each operator console (an operator console may be configured with four Information FPDs) and receives a user command; generates a sharing control signal by using the received user command; and transmits the same to the image signal relay control unit 150.

In an embodiment, each screen sharing control menu screen 200 may include a menu 210 related to a large display panel (LDP) representing each type of the displaying unit 140, and a menu 220 of an office PC monitor. Such two types of displaying units are used to maximally maintain an existing operation strategy (An LDP is a device applied for improving situation recognition through information sharing among operators. In addition, an office PC monitor is applied for supporting administration works of an operator but is also applied to an operator console in terms of maximally using an existing device), and to apply a screen sharing function while not adding an additional device to a digital main control room.

Figure 5:
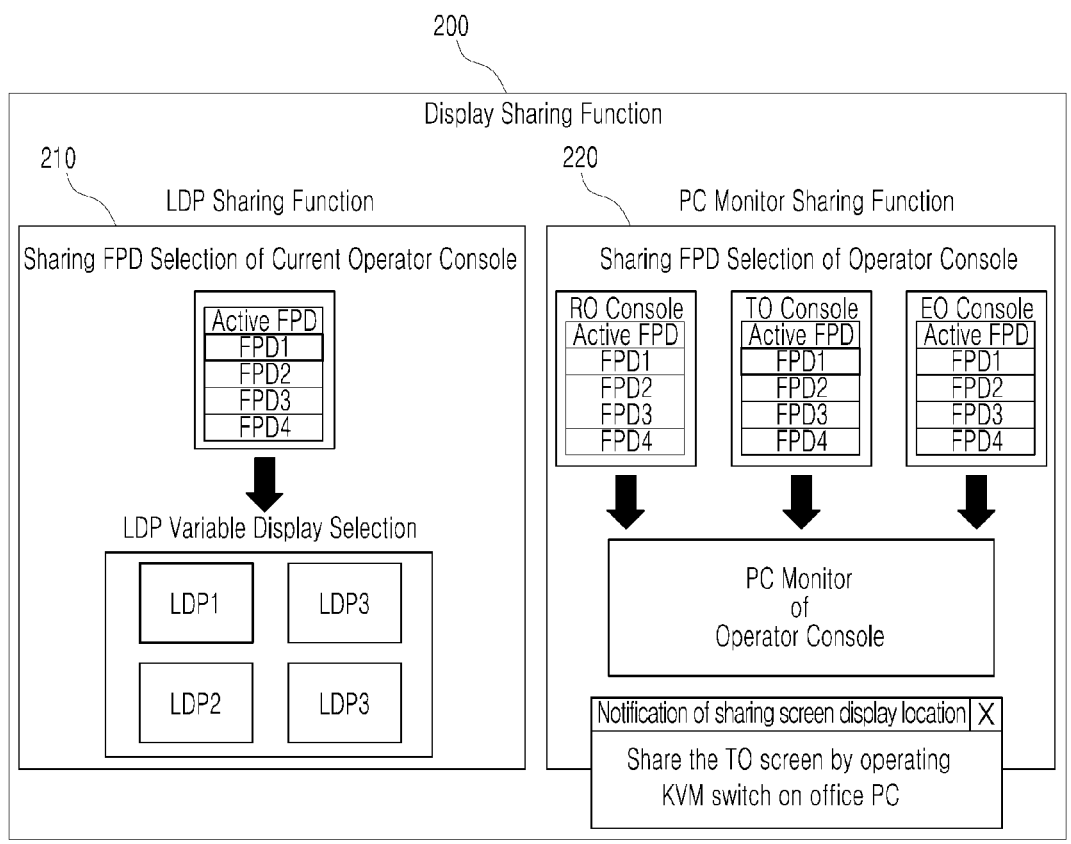
FIG. 5 is a view of a configuration of a screen sharing control screen according to an embodiment of the present invention.
Figure 6:
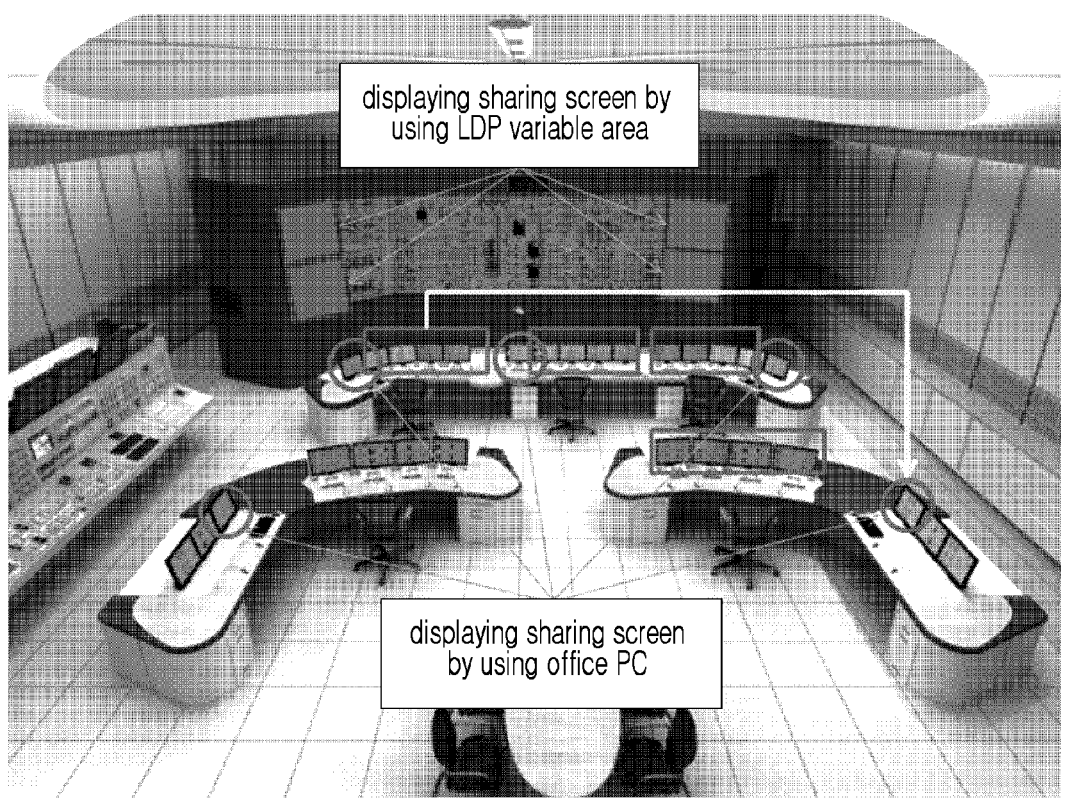
FIG. 6 is a view showing an example of a screen sharing system according to the present invention.

Referring to FIG. 5 showing an embodiment, from a screen sharing control menu screen 200, a power plant operator who is a user of the sharing control signal generating unit 140 may select a screen to be shared from a menu of FPD1, FPD2, FPD3, and FPD4 that constitute a FPD screen selection menu for FPD screens that are controlled by himself or herself. In addition, the sharing screen displaying unit 140 for outputting an image signal may be selected from a menu of LDP1, LDP2, LDP3, and LDP4 that constitute an LDP screen sharing control menu 210. Accordingly, screen sharing of an image signal of the selected FPD screen may be performed by continuously outputting the image signal to the selected LDL until another FPD or LDP is selected.

In addition, referring to FIG. 5 showing an embodiment, for each of four FPDs operated by respective operators divided into an reactor operator (RO), a turbine operator (TO), electrical operator (EO), etc., a PC monitor screen sharing control menu 220 of the screen sharing control menu screen 200 includes a menu of FPD1, FPD2, FPD3, and FPD4 for each FPD screen selection menu. An image signal selected by clicking a detailed menu of the FPD screen selection menu may be outputted to the office PC monitor. Herein, preferably, for example, when a user of the sharing control signal generating unit 140 is an RO, for a screen menu that is not required for sharing, the corresponding menu may be grayed out on the screen sharing control menu screen 200 to disable the menu since the RO that is he or she does not need to share his or her FPD screen.

In addition, referring to FIG. 5 showing an embodiment, a user may select an "Active FPD" menu in the LDP screen sharing control menu 210 from the screen sharing control menu screen 200 by clicking the same. When an operator who is a user of the screen sharing control menu screen 200 selects an "Active FPD" menu of the LDP screen sharing control menu 210, a plurality of screens may be shared in real-time by switching the same until another FPD menu is selected.

In other words, in order to share in real-time among other operators a screen that is currently manipulated among a plurality of FPD screens that are controlled by an operator who is a user of the screen sharing control menu screen 200, an "Active FPD" menu of the LDP screen sharing control menu 210 may be selected by clicking the same. Herein, a detection signal generated by the detection signal generating unit may be received in real-time in the image signal relay control unit 150, and according to the detection signal received in real-time, an image signal to be shared may be selected in real-time so that the image signal relay unit may control to output to the selected screen sharing displaying unit.

Accordingly, by providing an "Active FPD" menu for the LDP screen sharing control menu 210 of the screen sharing control menu screen 200, the sharing control signal generating unit 140 may enable a user to continuously share a screen or to select performing sharing by real-time screen switching in real-time according to a detection signal.

Similarly, when an operator who is a user of the screen sharing control menu screen 200 selects an "Active FPD" menu from the PC monitor screen sharing control menu 220 of an operator that is he or she that the operator wants to receive screen sharing thereof, an image signal of a screen among a plurality of FPD screens which is currently manipulated by the selected operator may be received in the office PC monitor.

In another embodiment, when implementing a real-time screen switching function, a screen sharing control menu screen may be configured with an LDP screen selection menu for selecting a display device of a sharing screen and without a FPD screen selection menu or "Active FPD" menu for selecting, by a user, an image signal to be shared.

The image signal relay control unit 150 receives a sharing control signal generated by the sharing control signal generating unit 140, and controls input/output of the image signal relay unit 130 according to the received sharing control signal.

In another embodiment, the image signal relay control unit 150 may receive a detection signal generated by the detection signal generating unit 160, and select an image signal of a screen to be shared according to the received detection signal. In addition, the image signal relay control unit 150 may receive a sharing control signal generated by the sharing control signal generating unit 140, and control input/output of the image signal relay unit 130 by selecting the screen sharing displaying unit 120 according to the received sharing control signal. Accordingly, screen sharing may be performed by switching in real-time to a screen that is currently manipulated in any screen sharing displaying unit 120. Accordingly, screen switching and sharing may be performed by immediate reaction to an input device manipulation of an operator for controlling a power plant, and thus real-time screen sharing among operators and monitoring through the same may be available.

Of course, the image signal relay control unit 150 may control the image signal relay unit 130 according to a sharing control signal capable of continuously sharing a screen selected by a user selection and switching of a sharing screen in real-time according to a detection signal by a user selection.

In order to configure the image signal relay control unit 130 on the basis of hardware, as a video matrix controller 151, additional hardware or an information processing device including a program controlling the video matrix 131 may be included. In addition, in an embodiment, a video matrix controller 151 may not be connected to an office PC for a cyber-security and may control a video matrix by being connected thereto through an RS-232C or Cat 5e cable and by using an RS-232C serial communication. FIG. 3 is a block diagram of a screen sharing system for a nuclear power plant digital main control room in which each image signal relay control unit is configured with a video matrix controller 151.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implanted in a distributed manner. Likewise, components described to be distributed can be implanted in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

DESCRIPTION OF THE REFERENCE NUMERALS 100 information processing system
110 image output unit
111: graphic card
112: video distributor
113: video scaler
120: sharing screen displaying unit
130: image signal relay unit
131: video matrix
140: sharing control signal generating unit
150: image signal relay control unit
151: video matrix controller
160: detection signal generating unit
200: screen sharing control menu screen
210: LDP screen sharing control menu
220: PC monitor screen sharing control menu

The invention claimed is:

1. A screen sharing system for a digital main control room of a nuclear power plant, wherein the screen sharing system includes an information processing system for digital control, the screen sharing system comprising:
an image signal output unit outputting and transmitting an image signal generated by using the information processing system;
a sharing screen displaying unit receiving the image signal and displaying the same;
an image signal relay unit connected to the image signal output unit and the sharing screen displaying unit, and receiving and outputting the image signal;
a detection signal generating unit generating a detection signal by detecting a manipulation of a control command input means of a power plant which is provided in the information processing system;

a sharing control signal generating unit selecting in real-time an image signal in response to the detection signal, and generating a sharing control signal selecting the sharing screen displaying unit selected by a user; and an image signal relay control unit receiving the sharing control signal generated by the sharing control signal generating unit and the detection signal generated by the detection signal generating unit, and controlling input/output of the image signal relay unit such that the image signal selected in real-time according to the received detection signal is displayed on the sharing screen displaying unit selected according to the sharing control signal.

2. The screen sharing system of claim 1, wherein the sharing control signal generating unit: selects an image signal selected by a user or selects an image signal in real-time in response to the detection signal; and generates the sharing control signal selecting the sharing screen displaying unit selected by the user, and the image signal relay control unit: receives the sharing control signal generated by the sharing control signal generating unit, and controls input/output of the image signal relay unit such that the image signal selected according to the received sharing control signal is displayed on the selected sharing screen displaying unit; or receives the sharing control signal generated by the sharing control signal generating unit and the detection signal generated by the detection signal generating unit, and controls input/output of the image signal relay unit such that the image signal selected in real-time according to the received detection signal is displayed on the sharing screen displaying unit selected according to the received sharing control signal.

3. The screen sharing system of claim 1, wherein the image signal output unit is configured with any one of a graphic card directly outputting an image signal of the information processing system, a video distributor outputting an image signal of the information processing system by copying the same, and a video scaler outputting a single image signal by overlapping a plurality of image signals of the information processing system, the image signal relay unit is a video matrix connected to the image signal output unit and the sharing screen displaying unit through an image signal cable, and the image signal relay control unit is a video matrix controller connected to the video matrix through a serial cable, wherein the image signal is transmitted through an image signal cable network rather than a network.

4. The screen sharing system of claim 2, wherein the image signal output unit is provided as a video scaler outputting a single image signal by overlapping a plurality of image signals of the information processing system, the image signal relay unit is a video matrix connected to the image signal output unit and the sharing screen displaying unit through an image signal cable, and the image signal relay control unit is a video matrix controller connected to the video matrix through a serial cable, wherein the image signal is transmitted through an image signal cable network rather than a network.

5. A screen sharing system for a digital main control room of a nuclear power plant, wherein the screen sharing system includes an information processing system for digital control, the screen sharing system comprising:

an image signal output unit outputting and transmitting an image signal generated by using the information processing system;

a sharing screen displaying unit receiving the image signal and displaying the same;

an image signal relay unit connected to the image signal output unit and the sharing screen displaying unit, and receiving and outputting the image signal;

a detection signal generating unit generating a detection signal by detecting a manipulation of a control command input means of a power plant which is provided in the information processing system;

a sharing control signal generating unit selecting in real-time an image signal in response to the detection signal, and generating a sharing control signal selecting the sharing screen displaying unit selected by a user; and an image signal relay control unit receiving the sharing control signal generated by the sharing control signal generating unit and the detection signal generated by the detection signal generating unit, and controlling input/output of the image signal relay unit such that the image signal selected in real-time according to the received detection signal is displayed on the sharing screen displaying unit selected according to the sharing control signal;

wherein the sharing control signal generating unit: selects an image signal selected by a user or selects an image signal in real-time in response to the detection signal; and generates the sharing control signal selecting the sharing screen displaying unit selected by the user, and the image signal relay control unit: receives the sharing control signal generated by the sharing control signal generating unit, and controls input/output of the image signal relay unit such that the image signal selected according to the received sharing control signal is displayed on the selected sharing screen displaying unit; or receives the sharing control signal generated by the sharing control signal generating unit and the detection signal generated by the detection signal generating unit, and controls input/output of the image signal relay unit such that the image signal selected in real-time according to the received detection signal is displayed on the sharing screen displaying unit selected according to the received sharing control signal.

6. The screen sharing system of claim 5, wherein the image signal output unit is configured with any one of a graphic card directly outputting an image signal of the information processing system, a video distributor outputting an image signal of the information processing system by copying the same, and a video scaler outputting a single image signal by overlapping a plurality of image signals of the information processing system, the image signal relay unit is a video matrix connected to the image signal output unit and the sharing screen displaying unit through an image signal cable, and the image signal relay control unit is a video matrix controller connected to the video matrix through a serial cable, wherein the image signal is transmitted through an image signal cable network rather than a network.

7. The screen sharing system of claim 5, wherein the image signal output unit is provided as a video scaler outputting a single image signal by overlapping a plurality of image signals of the information processing system, the image signal relay unit is a video matrix connected to the image signal output unit and the sharing screen displaying unit through an image signal cable, and the image signal relay control unit is a video matrix controller connected to the video matrix through a serial cable, wherein the image signal is transmitted through an image signal cable network rather than a network.

* * * * *